(12) United States Patent
Klausmann et al.

(10) Patent No.: US 10,029,617 B2
(45) Date of Patent: Jul. 24, 2018

(54) COVER FOR A GAP BEHIND A REAR SEAT BACKREST IN A VEHICLE

(71) Applicant: Ford Global Technologies, LLC, Dearborn, MI (US)

(72) Inventors: Tim Klausmann, Heinsberg (DE); Robert Wagschal, Ruppichteroth (DE); Frank Schneider, Iserlohn (DE)

(73) Assignee: Ford Global Technologies, LLC, Dearborn, MI (US)

( * ) Notice: Subject to any disclaimer, the term of this patent is extended or adjusted under 35 U.S.C. 154(b) by 0 days.

(21) Appl. No.: 15/627,597

(22) Filed: Jun. 20, 2017

(65) Prior Publication Data

US 2018/0001826 A1    Jan. 4, 2018

(30) Foreign Application Priority Data

Jul. 1, 2016    (DE) .................. 10 2016 212 037

(51) Int. Cl.
*B60R 5/04* (2006.01)
(52) U.S. Cl.
CPC .................... *B60R 5/047* (2013.01)
(58) Field of Classification Search
CPC ......... B60R 5/044; B60R 5/045; B60R 5/047; B60R 5/048
USPC ...... 296/24.42, 24.43, 37.16, 136.03, 136.12
See application file for complete search history.

(56) References Cited

U.S. PATENT DOCUMENTS

| | | | |
|---|---|---|---|
| 6,213,186 B1 * | 4/2001 | Torres .................... | B60J 1/2038 160/24 |
| 7,896,418 B2 | 3/2011 | Hofmann | |
| 8,465,079 B2 | 6/2013 | Saito et al. | |
| 9,016,758 B1 | 4/2015 | Lee et al. | |
| 2006/0022483 A1 | 2/2006 | Emerson | |
| 2008/0216971 A1 * | 9/2008 | Rockelmann .......... | B60J 1/2041 160/271 |
| 2008/0277077 A1 * | 11/2008 | Rockelmann .......... | B60J 1/2041 160/268.1 |
| 2009/0146448 A1 * | 6/2009 | Hofmann ............... | B60J 1/2019 296/97.4 |
| 2012/0145338 A1 * | 6/2012 | Takemura ............... | B60R 5/047 160/241 |

(Continued)

OTHER PUBLICATIONS

Zhang, Shouyin and Chen, Guimin, "Design of Compliant Bistable Mechanism for Rear Trunk Lid of Cars," pp. 291-299, School of Mechatronics, Xidian University, China, copyrighted Springer-Verlag, Berlin Heidelberg, 2011.

(Continued)

*Primary Examiner* — Gregory A Blankenship
(74) *Attorney, Agent, or Firm* — Vichit Chea; Price Heneveld LLP

(57) ABSTRACT

A cover is provided for covering a gap between a rear seat backrest of a vehicle and a luggage space cover of the vehicle, which cover extends in the transverse direction of the vehicle. The cover has a surface element which can be pulled out of a housing of the luggage space cover. Arranged on the surface element is at least one support element which, when pulled out of the housing, can be moved from a first stable position into a second stable position, wherein in the housing there is arranged at least one forced guide which at least at the output side thereof has a curved configuration so that the support element is forced into the second stable position.

20 Claims, 5 Drawing Sheets

(56) References Cited

U.S. PATENT DOCUMENTS

| | | | |
|---|---|---|---|
| 2012/0306228 A1* | 12/2012 | Brown | B60N 2/22 296/37.16 |
| 2014/0000984 A1 | 1/2014 | Thornton | |
| 2014/0015276 A1* | 1/2014 | Nagao | B60R 5/047 296/136.03 |
| 2015/0089974 A1 | 4/2015 | Seo et al. | |
| 2016/0325686 A1* | 11/2016 | Krishnan | B60R 5/047 |
| 2018/0001826 A1* | 1/2018 | Klausmann | B60R 5/047 |
| 2018/0111560 A1* | 4/2018 | Wu | B60R 5/045 |

OTHER PUBLICATIONS

Arup, Maji et al., "Actuation of Neutrally Stable Composite Tape-Springs with Shape Memory Alloy," 2 pages, published Jan. 2009 in Soc. for the Advancement of Material and Process Engineering.
Arup, Maji et al., "Actuation of Neutrally Stable Composite Tape-Springs with Shape Memory Alloy," pp. 18-33, vol. 41, No. 1, published Jan. 2009 in the Journal of Advanced Materials.

\* cited by examiner

COVER FOR A GAP BEHIND A REAR SEAT BACKREST IN A VEHICLE

FIELD OF THE INVENTION

The present invention generally relates to vehicle storage space covers, and more particularly to a cover for a gap of a vehicle arranged between a rear seat backrest of the vehicle and a housing of a luggage space cover of the vehicle.

BACKGROUND OF THE INVENTION

Vehicles of the combination construction type, multi-purpose vehicles (MPVs), off-road vehicles, sport utility vehicles, sport activity vehicles or the like, often have displaceable and/or foldable rear seats in order to be able to increase the luggage space. In addition, these vehicles normally have a luggage space cover which in the rearmost position of the rear seats in the longitudinal direction of the vehicle, when viewed in the travel direction, adjoins the rear side of the rear seat backrest. Between the backrest and the front edge of the luggage space cover there typically exists a gap which is more or less wide depending on the position of the rear seat backrest in the longitudinal vehicle direction. Already for reasons of break-in protection, there is a need to be able to close this gap in a non-permeable manner.

Covers are generally known which are secured both to the rear seat backrest and to a luggage space cover. For example, U.S. Pat. No. 9,016,758 discloses a passenger space cover which has a housing in which a first cover is arranged with a covering plate. The first cover can be selectively pulled from an inner space of the housing, in order to engage in a rear seat. Furthermore, the passenger space cover has a second cover which is arranged in the housing and which can be selectively pulled out of the inner space of the housing with respect to the first cover. A seat backrest of the rear seat has a seat plate which engages in the covering plate of the first cover when the seat backrest is arranged in an upright position.

U.S. Pat. No. 8,465,079 relates to the securing of a cover to a rear seat backrest. When the rear seat backrest is adjusted, the cover may also be accordingly arranged in an adjusted position.

U.S. Pat. No. 7,896,418 discloses a cover for a gap behind at least one rear seat backrest in a motor vehicle which is provided between it and a luggage space cover in the transverse direction of the vehicle, wherein the cover has at least one covering flap which is fixed in position on a housing of the luggage space cover and which is pivotably supported about a hinge and which is in abutment with the rear seat backrest in a pretensioned state in a position for use, wherein in an upper region and, when viewed in the travel direction, front region of the housing of the luggage space cover an integrated receiving member is provided for the hinge of the covering flap. U.S. Patent Application Publication No. 2006/0022483 also generally discloses a vehicle cover.

U.S. Patent Application Publication No. 2014/0000984 discloses a mat which can be rolled up and unrolled and which, as a result of two bistable resilient strips which extend along the longitudinal edges is intended to be able to be rolled up and unrolled more easily. U.S. Patent Application Publication No. 2015/0089974 discloses a mobile device which is carried on the member and in which a bistable spring is used to be able to move the device from a curved, closed state into a flat, open state.

The publication of G. Chen of Dec. 6-8, 2011 entitled "Design of Compliant Bistable Mechanism for Rear Trunk Lid of Cars," published in Springer Verlag, Heidelberg discloses the use of a bistable resilient structure in the mechanism of a trunk space cover. The publication of Arup Maji et al. from January 2009 entitled "Actuation of Neutrally Stable Composite Tape-Springs with Shape Memory Alloy" published in Soc. for the Advancement of Material and Process Engineering, 1161 Parkview Drive, Covina, Calif. 91724-3748, USA discloses the production of bistable flat springs using shape-memory alloys and carbon fibers. The above-mentioned patents and references are hereby incorporated herein by reference.

It would be desirable to provide for a cover for a gap behind a rear seat backrest in a vehicle that offers improvement. It would be particularly desirable to provide a cover for a gap of a vehicle, which gap is provided between a rear seat backrest of the vehicle and a luggage space cover of the vehicle, which cover extends in the transverse direction of the vehicle and is constructed in a structurally simple manner and is comparatively simple to handle.

SUMMARY OF THE INVENTION

According to one embodiment, a cover for extending in transverse direction of a vehicle for covering a gap between a rear seat backrest and a luggage space cover of a vehicle is provided. The cover includes a surface element which can be pulled out of a housing of the luggage space cover, at least one support element arranged on the surface element which, when pulled out of the housing, can be moved from a first stable position into a second stable position, and at least one forced guide arranged in the housing which at least at an output side thereof has a curved configuration to force the support element into the second stable position.

According to another aspect of the invention, a cover extendable to cover a gap between a rear seat backrest and a luggage space cover of a vehicle is provided. The cover includes a surface element extendable from a housing of the luggage space cover, a support element on the surface element and in a first stable position in the housing, and a forced guide comprising a curved configuration to force the support element into a second stable position when pulled out of the housing.

These and other aspects, objects, and features of the present invention will be understood and appreciated by those skilled in the art upon studying the following specification, claims, and appended drawings.

DETAILED DESCRIPTION OF THE PREFERRED EMBODIMENTS

Figure 1:
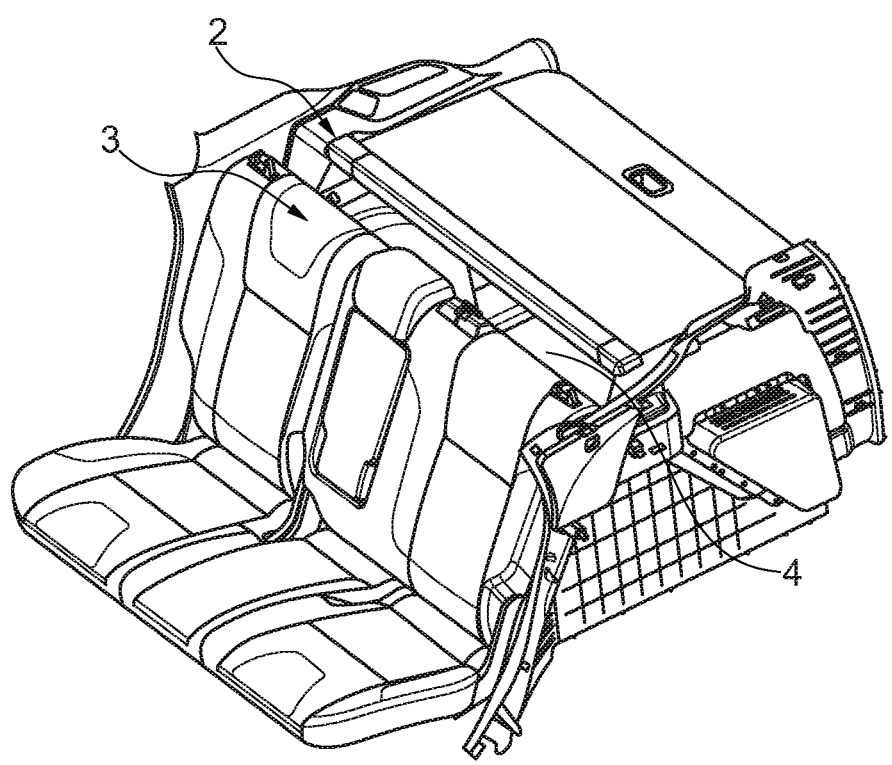
FIG. 1 is a perspective view of a vehicle rear seating and luggage storage arrangement that may employ a cover.

In the different figures, identical components are always given the same reference numerals, for which reason they are generally also only described once.

Figure 2:
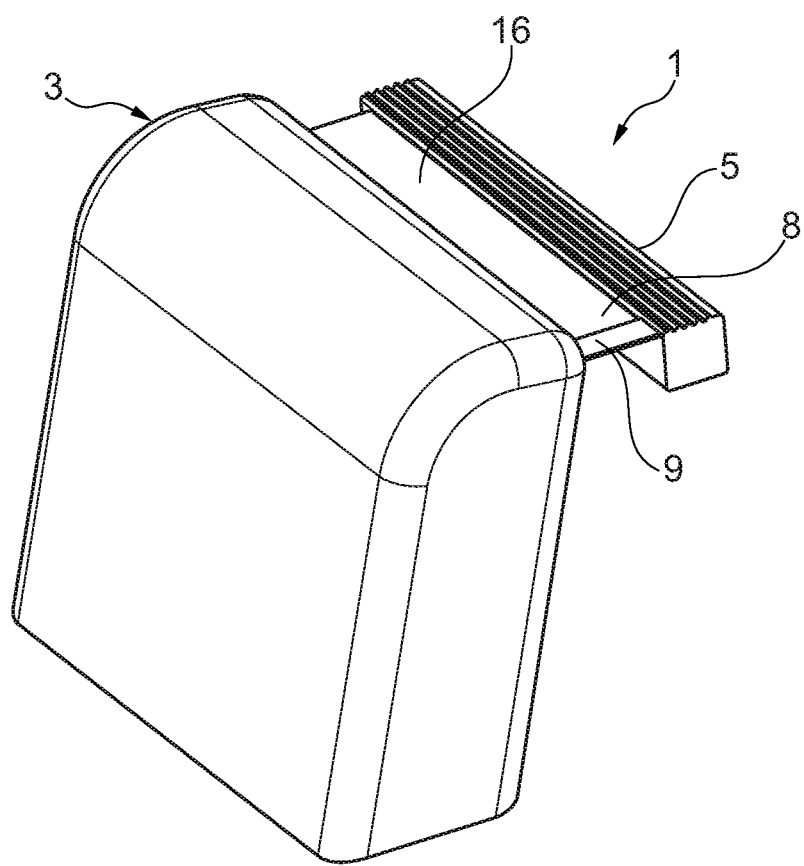
FIG. 2 is a perspective view of a cover that may be useful to cover the gap shown in FIG. 1, according to one embodiment.
Figure 3:
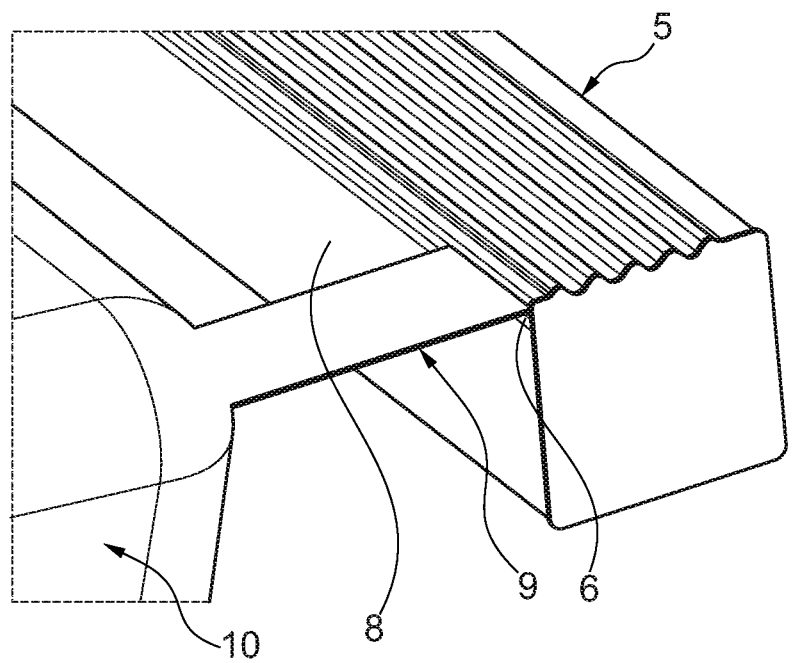
FIG. 3 is an enlarged detailed perspective view of the cover shown in FIG. 2.

The arrangement of the cover 1 according to one embodiment illustrated in FIG. 2 is intended to be explained with reference to FIG. 1. For example, vehicles of the combination construction type, that is to say, station wagons, have a luggage space which is not separated from the inner space provided for the passengers by a bodywork partition member. Generally, such vehicles have only one luggage space cover 2, generally in the form of a pull-out blind. Since a variable adjustment of the rear seat backrest 3 in the longitudinal direction of the vehicle is further desired, depending on the position of the rear seat backrest 3 an undesirable gap 4 shown in FIG. 1 remains between the rear seat backrest 3 and the luggage space cover 2. Such a gap 4 enables the interior of the luggage space to be seen and is consequently undesirable at least for reasons of break-in protection. In order to prevent this, the cover 1 shown in FIG. 2 is provided to cover the gap 4.

The cover 1 has a housing 5 which is arranged with respect to the forward travel direction of the vehicle behind the rear seat backrest 3. The housing 5 has a slot 6 (FIG. 4) and is otherwise closed. The slot 6 is arranged at a side of the housing 5 facing the front vehicle side. From this slot 6 of the housing 5 there projects a textile surface element 8 which is supported, for example, by means of two support elements 9 which are arranged laterally at the side edges of the textile surface element 8 and which freely support the surface element 8.

The support elements 9 are secured to the surface element 8 and together with the surface element 8 are also arranged in the housing 5 in order, if necessary, to be able to be removed from the housing 5 via the slot 6 together with the surface element 8 in accordance with the width of the gap 4, where applicable by means of pulling with a force.

The support elements 9 are connected to the preferably textile surface element 8 in a non-positive-locking, materially engaging and/or positive-locking manner, for example, sewn. The surface element 8 may laterally surround the respective support element 9 so that it is almost invisible so that a uniform appearance is provided.

FIG. 2 shows only an outer side region of the cover 1 so that the second support element 9 which is provided at the opposing flank of the surface element 8 is not illustrated in detail in FIGS. 2-6. The support element 9 is in each case a bistable resilient element, that is to say, a bistable resilient strip, according to one embodiment.

The support element 9 can assume two stable positions 10 and 11. In a position located outside the housing 5, that is to say, in the pulled-out position, the support element 9 has the second stable position 10 which can be seen in FIGS. 2, 3 and 6. In the position arranged inside the housing 5, that is to say, in the wound position, the support element has the first stable position 11 which can be seen in FIG. 4.

Figure 4:
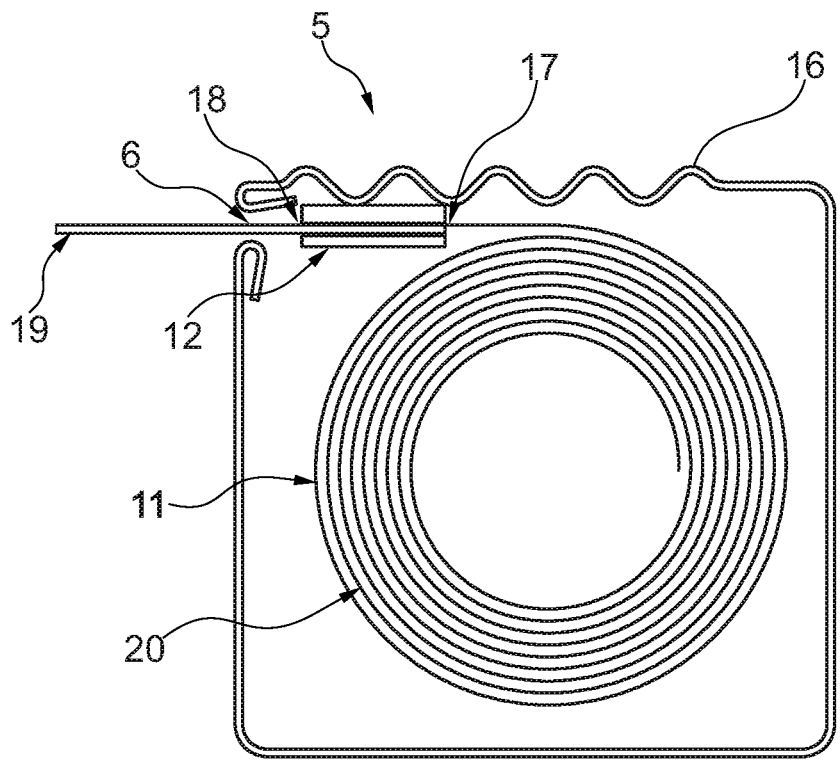
FIG. 4 is a sectioned view of the cover shown in FIG. 2.

The second stable position 10 is forced on the respective support element 9 by means of a forced guide 12. Corresponding forced guides 12 are also provided in accordance with the number of support elements 9. In this regard, the housing 5 has for the respective longitudinal side of the textile surface element 8 a forced guide 12. The forced guides 12 are each arranged inside the housing 5 and are located shortly before the slot 6, as can be seen in FIG. 4. The forced guides 12 are secured to a cover 16 of the housing 5, for example, screwed, adhesively bonded or otherwise secured. The cover 16 is constructed in a ribbed manner merely by way of example.

Figure 5:
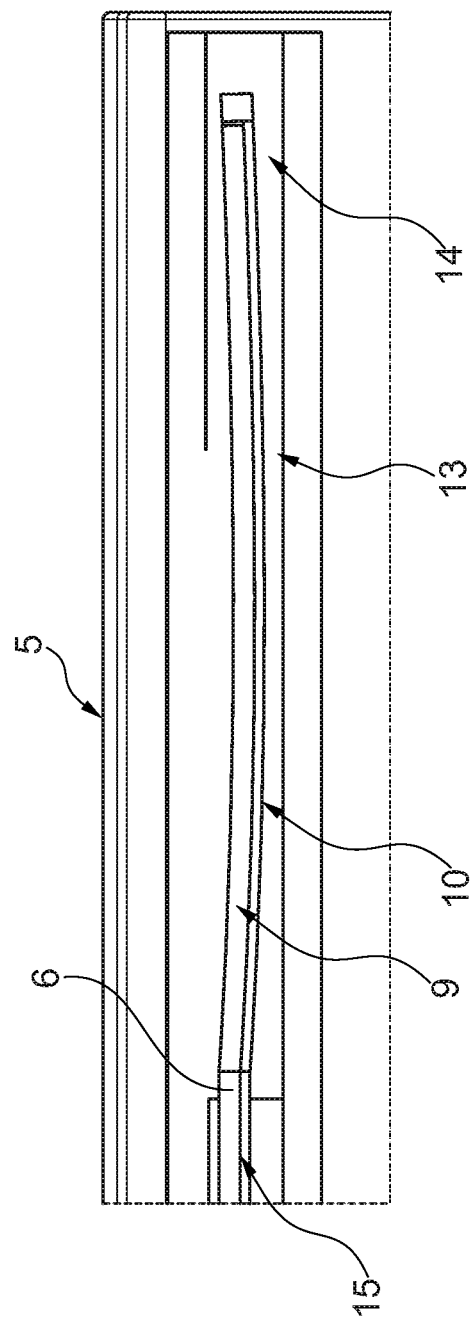
FIG. 5 is a front view of a side region of the cover shown in FIG. 2.

The forced guide 12 has in each case a curved path with a curvature whose vertex 13 is arranged approximately at the center of the forced guide 12. The width of the forced guide 12 when viewed in the transverse direction corresponds substantially to the width of the respective support element 9, wherein the forced guide 12 still has a lateral play, as can be seen in FIG. 5. As can further be seen in FIG. 5, the forced guide 12 has a convex path, that is to say, a curvature which is curved downward in the direction toward a vehicle base.

If the textile surface element 8 together with the two support elements 9 is now pulled out of the housing 5, the shape of the forced guides 12 is imposed on the respective support element 9. In this regard, the support elements 9 are forced into the second stable position 10, that is to say, almost pretensioned in such a manner that the support elements 9, that is to say, the bistable resilient strips, have a convex path along the extended longitudinal extent. In this second stable position, the support elements 9 remain at least until the textile surface element 8 is intended to be rolled in again and the support elements 9 assume the first stable position 11 which is illustrated in FIG. 4.

The slot 6 is curved in the region of the forced guide 12, that is to say, in the respective end-side region 14 corresponding to the forced guide 12. Between the curved regions 14 which are arranged at the end side, the slot 6 has a linearly extending central portion 15. Naturally, the slot 6 may also be constructed in a linear manner in the end-side region 14, wherein the slot 6 is then, however, intended, at least at that location in the passage thereof, to be sized in such a manner that the second stable position 10 of the support elements 9 which is imposed by means of the forced guide 12, that is to say, the imposed curved shape thereof, can be maintained.

The forced guide 12 may be configured in such a manner that it has at the inner side 17 thereof a linear form which changes over the longitudinal extent of the forced guide 12 to the curved shape so that the curved shape is imposed on the support element 9 in each case at the outer side. The outer side 18 of the forced guide 12 is naturally orientated toward the slot 6. The forced guide 12 may thus have two regions which have different shapes and which merge continuously, that is to say, gently into each other in order to correspondingly form the respective support element 9. If the surface element 8 is pulled in again, the forced guide 12 brings about a cancellation of the curved forced shape of the support element 9 and changes it to the planar form so that easy rolling-up inside the housing 5 is possible (first stable position 10). Depending on the winding direction, therefore, either the first stable position 10 or the second stable position 11 is imposed on the support element 9. However, this only applies to the portion which also passes the inner side 17 of the forced guide 12. The support element 9 thus has a portion 19 which is in the second stable position 10 and a portion 20 which is in the first stable position 11. This is intended to be understood in such a manner that the support element 9 together with the surface element 8 is pulled only so far out of the housing 5 that the gap 4 is covered, which constitutes the portion 19. In this instance, however, there is still a remainder, that is to say, the portion 20, arranged inside the housing 5 in the rolled-up state.

For example, in the housing 5 a winding mechanism similar to a blind is provided and the support elements 9 and the textile surface element 8 may be wound around a winding rod or winding pipe which is not shown in FIG. 4 and secured thereto at the end side. By pulling out and unwinding, the width of the cover 1 can be adapted in a variable manner to the width of the gap 4, wherein, as a result of the unwinding operation and the passing of the forced guide 12, the portion of the respective support element 9 removed from the housing 5 is moved into the second stable position 10 in which the freely supporting function of the support element 9, that is to say, the bistable resilient strip 9, is ensured.

FIG. 5 is a front view of a side region of the housing 5 of the cover 1 with the slot 6 in the housing 5, through which the support element 9 together with the textile surface element 8 is guided out of the housing 5. In the region behind the slot opening, there can be seen the forced guide 12 which defines the convex shape for the support element 9 and which, when the support element 9 is guided through it, imposes the curved cross section which corresponds to the second stable position 10 onto it so that it can perform the function freely supporting the surface element 9 without requiring any additional supports of the surface element 8 and the support element(s) 9 in addition to the securing to the housing 5. It is possible to provide at the end face of the surface element 8 or the respective support element 9 securing arrangements which cooperate with corresponding counter-securing arrangements on the rear seat backrest 3. For example, hooks and eyes, hook and loop connections or catch connections may be provided, which is naturally intended only to be by way of example.

Figure 6:
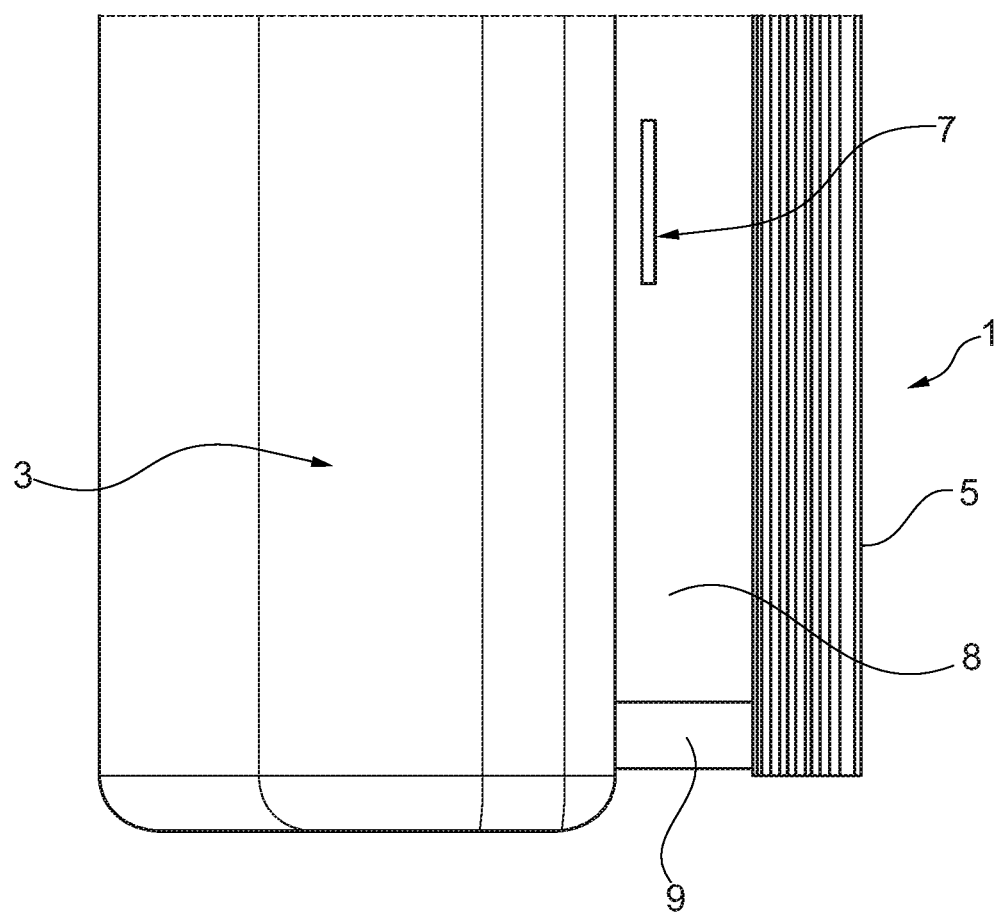
FIG. 6 is a plan view of a side region of the cover shown in FIG. 2.

FIG. 6 is a plan view of the side region from FIG. 5, wherein the arrangement of the cover 1 behind the rear seat backrest 3 of the vehicle can be seen. In order to more readily pull out the surface element 8 which is located in the wound state in the housing 5 together with the support elements 9, a handle 7, for example, in the form of a web, is provided. The web 7 is sized in such a manner that it can be readily gripped and virtually forms a winding block so that the surface element 8 together with the support elements 9 can be rolled into the housing 5 only up to a predetermined amount and can be readily rolled out again. The handle 7 may also be constructed as an access opening, wherein a protrusion may be provided as a winding block, wherein the winding mechanism can also be configured only for a specific rolling-in length.

It should be noted that the features and measures which are set out individually in the following description can be combined with each other in any technically advantageous manner and set out other embodiments. The description additionally characterizes and specifies the disclosure, in particular in connection with the figures.

An improved cover for a gap of a vehicle is provided. For example, the gap is a gap between the parcel shelf and the rear seat backrest or a gap between the rear seat backrest and the rear flap, wherein the cover would perform the task of the conventional luggage space cover. However, it is preferably a gap which is provided between a rear seat backrest of the vehicle and a housing of a luggage space cover of the vehicle, which housing extends in the transverse direction of the vehicle. The cover according to one embodiment has a flexible surface element and at least one support element which is arranged on the surface element. The support element, when pulled out of the housing, can be moved into a second stable position and carries the flexible surface element in an unsupported manner. The support element is constructed for arrangement extending in the gap, in particular in the longitudinal vehicle direction between the rear seat backrest and the housing of the luggage space cover. The support element is, for example, connected to the surface element in a non-positive-locking, positive-locking and/or materially engaging manner.

Preferably, the surface element is a textile surface element, wherein the support element is sewn to the surface element, according to one embodiment. The support element may be surrounded, that is to say, enclosed, by a portion of the surface element and/or received in sewn pockets in the surface element. A quasi uniform appearance is thus ensured, wherein sufficient securing is always provided in such a manner that the self-supporting property of the support element acts on the surface element.

A self-supporting construction of the support element is intended to be understood to mean a function of the support element carrying the surface element, without the requirement for additional support of the surface element, for example, on the internal trim of the passenger compartment of the vehicle.

Advantageously, there is provision for the support element to be constructed as a bistable resilient element, wherein the bistable resilient element can be moved from a first stable position to a second stable position and back. In the second stable position, as a result of the bistable resilient element, an arrangement of the cover which covers the gap is brought about. In the first stable position, as a result of the bistable resilient element, an arrangement of the cover which at least partially releases the gap is brought about. That is to say, the stable positions of the bistable support element enable, on the one hand, a position of the cover which covers the gap and, on the other hand, a position of the cover which releases the gap. For example, in the second stable position of the bistable resilient element, the position thereof corresponds to that of a substantially linearly or slightly curved cantilever arm which is supported at one side and which protrudes into the gap, whilst the support element in the first stable position assumes a position which is greatly curved with respect to the second position and at least partially releases the gap.

The use of the bistable resilient element achieves a comparatively simple-to-handle cover which requires comparatively few securing components and in particular does not make fixings, for example, at side regions of the vehicle necessary. Particularly, the latter reduces the production costs and the weight of the vehicle.

The bistable resilient element is, for example, one of sheet spring steel which may be processed by punching, bending, folding and/or stamping in such a manner that it is capable of assuming the two stable positions. In this regard, the support element, that is to say, the bistable resilient element, can also be referred to as a bistable resilient strip.

Preferably, at both sides of the textile surface element, that is to say, at the outer longitudinal edges thereof in each case, a support element, that is to say, a bistable resilient element or strip, is arranged. The support element has a longitudinal extent which is identical to the longitudinal extent of the surface element when the surface element is in the maximum rolled-out or maximum pulled-out state.

According to one embodiment, there is provision, in the first stable position of the bistable resilient element, for the surface element and the bistable resilient element to be located in a wound state. As a result of manual unwinding, that is to say, pulling out the textile surface element together with the support element which is preferably arranged at both sides, by use of a forced guide in each case, the bistable resilient element in the unwound portion of the bistable surface element is moved into the second stable position according to one embodiment.

The forced guide is arranged according to one embodiment inside the housing and forces the respective support element into a pretensioned state so that the support element, that is to say, the bistable resilient strip, in the pulled-out state of the cover is located in the second stable position. To this end, the forced guide has, when viewed in the transverse direction, a bent path. The bent path has a curvature which has its vertex in the center of the forced guide. The curvature may be convex or concave. The support element, that is to say, the bistable resilient strip, forcibly receives a similarly convex or concave form, corresponding to the path of the forced guide, when the textile surface element is pulled out. The support element keeps this forced form until it has been rolled into the housing again, that is to say, moved into the first stable position. For example, the surface element and the bistable resilient element are wound around a winding rod or pipe which is supported in a rotationally movable manner.

According to one embodiment, therefore, there is provision for the cover to have a housing in which the surface element and the at least one support element are at least partially received and, in a state adapted to the housing as required, preferably to the respective width of the gap, are removably supported so that the cover can be adapted in a simple manner to the gap or the width thereof when viewed in the longitudinal direction of the vehicle.

According to another embodiment, a winding mechanism is further provided. Such a winding mechanism is known in principle and has, for example, a blocking position and a release position. In the blocking position, the cover is retained in a positionally secure manner in the extracted position thereof adapted to the gap, wherein the support elements which are arranged at both sides are in the second stable position, that is to say, deformed in a convex or concave manner, that is to say, are pretensioned so as to freely support the surface element. The release position is reached after the blocking position by the support element and the surface element being unwound together again over a predetermined release length so that the winding mechanism brings about independent rolling-up. In this instance, the surface element is wound up together with the support element which is preferably arranged at both sides. During the winding-up, the support element passes the forced guide in each case, wherein the forced convex or concave shape when viewed in the transverse direction can be maintained. However, it is possible for the imposed convex or concave shape in the wound-up state to be canceled so that the support element in each case has a linear configuration. This is intended to be understood in such a manner that the surface element together with the support elements which are arranged thereon may be rolled up in a helical manner. However, the forced curvature when viewed in the transverse direction may be canceled.

The cover may in an embodiment be secured to the rear seat backrest. However, there is preferably provision for the cover to be arranged at the opposing side of the gap which belongs to the luggage space cover. Even more preferably, there is provision for it to be secured to the luggage space cover which is provided in any case for arrangement in a transverse vehicle direction of a vehicle and consequently to form a unit therewith. It is preferable for a common housing to be provided. A luggage space cover is intended to be understood to be one which is configured if necessary to cover the storage space of the vehicle with another surface element. For example, for this additional surface element, an optionally additional winding mechanism is provided.

It will be understood that any described processes or steps within described processes may be combined with other disclosed processes or steps to form structures within the scope of the present invention. The exemplary structures and processes disclosed herein are for illustrative purposes and are not to be construed as limiting.

What is claimed is:

1. A cover for extending in transverse direction of a vehicle for covering a gap between a rear seat backrest and a luggage space cover of a vehicle, comprising:
   a surface element which can be pulled out of a housing of the luggage space cover;
   at least one support element arranged on the surface element which, when pulled out of the housing, can be moved from a first stable position into a second stable position; and
   at least one forced guide arranged in the housing which at least at an output side thereof has a curved configuration to force the support element into the second stable position.

2. The cover as claimed in claim 1, wherein the at least one support element is constructed as a bistable resilient element.

3. The cover as claimed in claim 2, wherein the at least one support element comprises a bistable resilient strip.

4. The cover as claimed in claim 1, wherein the at least one support element in the second stable position thereof has a curved configuration.

5. The cover as claimed in claim 1, wherein the at least one support element is pretensioned in the second stable position.

6. The cover as claimed in claim 1, wherein there are provided at least two support elements, which are arranged at lateral longitudinal edges of the surface element with respect to a longitudinal vehicle axis.

7. The cover as claimed in claim 1, wherein the support element is connected to the surface element, and wherein the support element is received in a pocket of the surface element.

8. The cover as claimed in claim 7, wherein the support element is sewn to the surface element.

9. The cover as claimed in claim 1, wherein the at least one forced guide which has an input side and an opposing output side, wherein the input side has a linear configuration, and wherein the opposing output side has a curved configuration so that the support element, when the surface element is pulled out by passing the at least one forced guide, can be moved into the pretensioned and curved second stable position, in which the support element together with the surface element covers the gap in a self-supporting manner, and wherein the support element during rolling into the housing by passing the at least one forced guide can be moved into the first stable position, in which the support element together with the surface element is rolled up inside the housing.

10. The cover as claimed in claim 1 further comprising a winding mechanism arranged in the housing so the surface element together with the support element can be pulled out of the housing and rolled up in the housing, wherein the winding mechanism has one of a winding rod and a winding pipe.

11. A cover extendable to cover a gap between a rear seat backrest and a luggage space cover of a vehicle, comprising:
    a surface element extendable from a housing of the luggage space cover;
    a support element on the surface element and in a first stable position in the housing; and a forced guide comprising a curved configuration to force the support element into a second stable position when pulled out of the housing.

12. The cover as claimed in claim 11, wherein the support element is constructed as a bistable resilient element.

13. The cover as claimed in claim 12, wherein the support element comprises a bistable resilient strip.

14. The cover as claimed in claim 11, wherein the support element in the second stable position thereof has a curved configuration.

15. The cover as claimed in claim 11, wherein the support element is pretensioned in the second stable position.

16. The cover as claimed in claim 11, wherein the cover is extendable in a transverse direction of the vehicle, and wherein there are provided at least two support elements, which are arranged at lateral longitudinal edges of the surface element with respect to a longitudinal vehicle axis.

17. The cover as claimed in claim 11, wherein the support element is connected to the surface element, and wherein the support element is received in a pocket of the surface element.

18. The cover as claimed in claim 17, wherein the support element is sewn to the surface element.

19. The cover as claimed in claim 11, wherein the forced guide which has an input side and an opposing output side, wherein the input side has a linear configuration, and wherein the opposing output side has the curved configuration at an output side of the housing so that the support element, when the surface element is pulled out by passing the forced guide, can be moved into the pretensioned and curved second stable position, in which the support element together with the surface element covers the gap in a self-supporting manner, and wherein the support element during rolling into the housing by passing the forced guide can be moved into the first stable position, in which the support element together with the surface element is rolled up inside the housing.

20. The cover as claimed in claim 11 further comprising a winding mechanism arranged in the housing so the surface element together with the support element can be pulled out of the housing and rolled up in the housing, wherein the winding mechanism has one of a winding rod and a winding pipe.

* * * * *